US012616922B2

(12) United States Patent
Alabkary et al.

(10) Patent No.: US 12,616,922 B2
(45) Date of Patent: May 5, 2026

(54) GAS PLANT HYDROCARBON RECOVERY MANAGEMENT SYSTEM AND PROCESS

(71) Applicant: SAUDI ARABIAN OIL COMPANY, Dhahran (SA)

(72) Inventors: Yousif Alabkary, Dhahran (SA); Mishar Kumar Paul, Dhahran (SA); Fahad Dhahri, Dhahran (SA); Khalid Alfahadi, Dhahran (SA); Khalid A. Alsaadi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 239 days.

(21) Appl. No.: 18/626,191

(22) Filed: Apr. 3, 2024

(65) Prior Publication Data

US 2025/0312710 A1     Oct. 9, 2025

(51) Int. Cl.
  B01D 19/00 (2006.01)
  B01D 17/02 (2006.01)
  B01D 17/12 (2006.01)
  C10G 33/06 (2006.01)

(52) U.S. Cl.
  CPC ..... B01D 19/0063 (2013.01); B01D 17/0214 (2013.01); B01D 17/12 (2013.01); B01D 19/0042 (2013.01); B01D 19/0068 (2013.01); C10G 33/06 (2013.01); C10G 2300/4043 (2013.01)

(58) Field of Classification Search
  CPC ............ B01D 19/0063; B01D 17/0214; B01D 17/12; B01D 19/0042; B01D 19/0068; C01G 33/06; C01G 2300/4043
  See application file for complete search history.

(56) References Cited

U.S. PATENT DOCUMENTS

| | | | | |
|---|---|---|---|---|
| 4,042,025 | A | * | 8/1977 | Skinner .................. E21B 43/12 |
| | | | | 166/305.1 |
| 5,922,064 | A | * | 7/1999 | Gordon, Sr. ............. C02F 1/40 |
| | | | | 210/522 |
| 6,094,937 | A | * | 8/2000 | Paurola ................. F25J 1/0022 |
| | | | | 62/613 |
| 2012/0152121 | A1 | * | 6/2012 | Sampath ............ B01D 19/0042 |
| | | | | 96/182 |
| 2017/0174530 | A1 | * | 6/2017 | Yin .................... B01D 17/0217 |

* cited by examiner

*Primary Examiner* — Ali Z Fadhel
(74) *Attorney, Agent, or Firm* — Vorys, Sater, Seymour and Pease LLP

(57)        ABSTRACT

A gas plant hydrocarbon recovery management system includes a hydrocarbon blowdown header flowline for receiving a hydrocarbon drainage composition, a recovery flowline extending from the header flowline to receive a portion of the composition, a three-phase gravity separator in fluid communication with the recovery flowline via a first flowline, and a hydrocarbon recovery vessel in fluid communication via a second flowline. A three-way control valve is arranged in the recovery flowline and actuatable between a first operational state, where the portion of the composition is entirely diverted through the first flowline and to the three-phase gravity separator, and a second operational state, where some of the portion of the composition is diverted also to the second flowline and to the hydrocarbon recovery vessel. The valve is actuated from the first to the second operational state when a flow rate through the first flowline reaches a predetermined maximum flow rate.

15 Claims, 3 Drawing Sheets

GAS PLANT HYDROCARBON RECOVERY MANAGEMENT SYSTEM AND PROCESS

FIELD OF THE DISCLOSURE

The present disclosure relates generally to systems and processes for gas plant hydrocarbon recovery management and, more particularly, to gas plant hydrocarbon recovery management for reduced greenhouse gas emissions and enhanced hydrocarbon capture.

BACKGROUND OF THE DISCLOSURE

As global energy demand grows, greenhouse gas emissions will arguably also increase. This growth in greenhouse gas emissions disrupts the balance of the earth's ecosystem and affects all life. Greenhouse gases, particularly carbon dioxide ($CO_2$), undesirably absorb and emit radiation into the atmosphere, causing a "greenhouse effect." Attention to reducing greenhouse gases has focused on $CO_2$ emissions due to the ever-increasing combustion processes emitting $CO_2$ as a waste product into the environment.

Lawmakers worldwide have recently focused their efforts on cutting $CO_2$ emissions by championing carbon neutrality by legislating the development of new technologies and changing tax, penalty, and incentive programs to reduce $CO_2$ emissions and to develop new net zero carbon integrative processes. The International Energy Agency set forth a pathway for the global energy sector to reach net zero $CO_2$ emissions by 2050, which has the potential to decrease about 80 gigatons of $CO_2$ released into the atmosphere. Accordingly, many countries and organizations have pledged to achieve this goal.

During conventional gas plant hydrocarbon recovery, as part of a gas plant wet blowdown system, a significant way $CO_2$ escapes into the atmosphere is the burning of excess hydrocarbons in gas plant-associated burn pits. Hydrocarbons are generally burned in burn pits to dispose of liquid or mixed liquid-vapor during gas plant operations, including startup, maintenance (e.g., slugging of pipelines or vessels, such as slug catchers), testing, and for emergency purposes. However, conventional gas plants have relatively limited hydrocarbon recovery capacity (e.g., about 3,800 gallons) and are not designed to account for the high amount of hydrocarbon liquid drained due to various operations, such as slugging, Turnaround and Inspection activities, emergency scenarios, or unexpected abnormal situations. As such, the volume of excess hydrocarbons reaching the burn pit can be relatively high, increasing $CO_2$ emissions and diminishing hydrocarbon recovery. Moreover, the relatively sizable volume of excess hydrocarbons burned in the burn pit during hydrocarbon recovery in a gas plant can reduce the lifetime of the burn pit itself, thus adding operational costs associated with corrective measures.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a gas plant hydrocarbon recovery management system is disclosed and includes a hydrocarbon blowdown header flowline for receiving a hydrocarbon drainage composition, a recovery flowline extending from the hydrocarbon blowdown header flowline to receive a portion of the hydrocarbon drainage composition, a three-phase gravity separator in fluid communication with the recovery flowline via a first flowline, a hydrocarbon recovery vessel in fluid communication via a second flowline, and a three-way control valve arranged in the recovery flowline and actuatable between a first operational state, where the portion of the hydrocarbon drainage composition is entirely diverted through the first flowline and to the three-phase gravity separator, and a second operational state, where some of the portion of the hydrocarbon drainage composition is diverted also to the second flowline and to the hydrocarbon recovery vessel. The three-way control valve is actuated from the first operational state to the second operational state when a flow rate through the first flowline reaches a predetermined maximum flow rate.

According to an embodiment consistent with the present disclosure, a method is disclosed and includes the steps of receiving a hydrocarbon drainage composition in a hydrocarbon blowdown header flowline, diverting a portion of the hydrocarbon drainage composition into a recovery flowline that fluidly communicates with a three-phase gravity separator via a first flowline and fluidly communicates with a hydrocarbon recovery vessel via a second flowline, wherein a three-way control valve is arranged in the recovery flowline, placing the three-way control valve in a first operational state, where the portion of the HC drainage composition is entirely diverted through the first flowline and to the three-phase gravity separator, monitoring a flow rate through the first flowline, determining that the flow rate through the first flowline has reached a predetermined maximum flow rate, and transitioning the three-way control valve to a second operational state, where some of the portion of the HC drainage composition is diverted to the second flowline and to the hydrocarbon recovery vessel.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
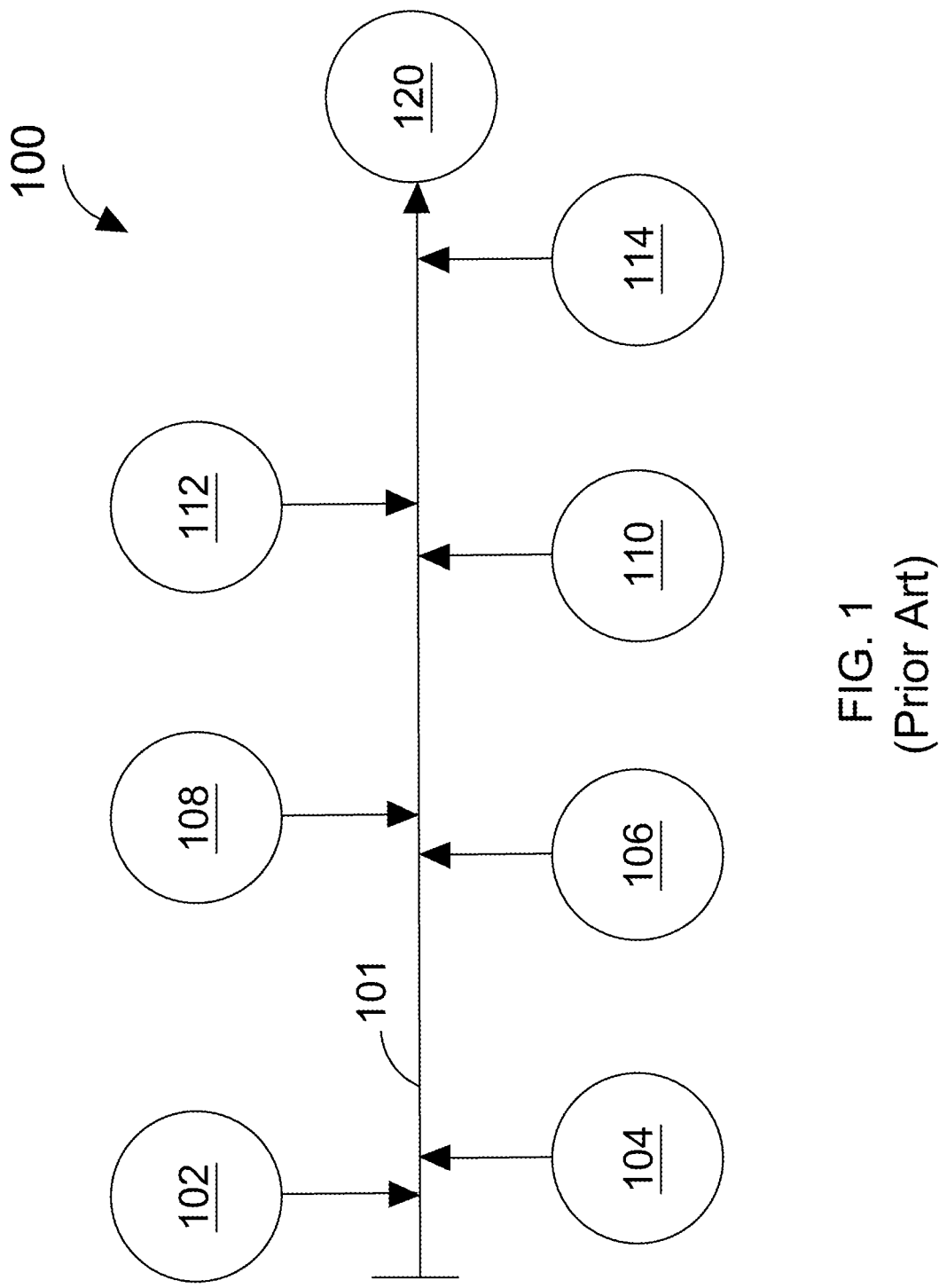
FIG. 1 is a schematic illustration of a prior art gas plant wet blowdown system.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to systems and processes for gas plant hydrocarbon recovery management and, more particularly, to gas plant hydrocarbon recovery management for reduced greenhouse gas emissions and enhanced hydrocarbon capture. In view of the aforementioned issues associated with conventional gas plant hydrocarbon ("HC") recovery systems and methods, the present disclosure advantageously incorporates a three-phase gravity separator and associated three-way control valve into gas plant HC recovery systems. The three-phase gravity separator and three-way control valve are capable of receiving a comparatively larger volume of excess hydrocarbons via the collection of all or substantially all drainage liquid from a HC recovery system, thereby reducing $CO_2$ emissions, increasing hydrocarbon recovery and increasing the lifetime of associated gas plant burn pits. To account for the separation of any sludge or solids received by the three-phase gravity separator, a sludge spool may optionally be incorporated at a bottom location of the separator for sludge and/or solids removal, without any impact on operations. The three-way control valve incorporated into the gas plant HC systems described herein may further include proper instrumentation and control logic (referred to herein collectively as "control logic") operable to efficiently control gravity blowdown of HC liquid.

The overall gas HC recovery plant systems and methods comprising the three-phase gravity separator and three-way control valve described herein can advantageously meet net zero $CO_2$ emissions, while reducing operational costs associated with gas HC recovery plants. Operational cost reduction is achieved at least by incorporating the three-phase gravity separator into extant gas plant HC systems to increase the lifetime of burn pits. Moreover, the present disclosure provides a pathway to increase economic profits by maximizing hydrocarbon recovery.

FIG. 1 is a schematic illustration of a simplified prior art gas plant wet HC blowdown system 100. Inherently, a wet HC blowdown recovery system is designed to recover HC from a wet blowdown header coming from plant instrumentation and other drains through a gravity separator vessel. As shown, the system 100 includes a wet blowdown header flowline 101 to receive mainly a hydrocarbon (HC) liquid or mixture of a HC liquid and water. The flowline 101 may be a pipeline, tubing, or other conduit, without limitation. Various equipment performing various processing activities are inline with and feed the flowline 101, which receive hydrocarbon drainage composition (e.g., HC-containing liquids or liquid-vapors) that eventually flow through the flowline 101 to be received and burned by a burn pit 120. As used herein, the term "hydrocarbon drainage composition" or "HC drainage composition," and grammatical variants thereof, refers to a composition comprising oil (i.e., hydrocarbons, both light and heavy), water, gas, and generally an amount of sludge and/or other solid contaminants.

An inlet facility 102 is inline (i.e., in fluid communication) with the flowline 101 and may comprise one or more slug catcher units for collecting upstream pipeline slug volumes, and an initial three-phase separator to separate oil, water, and gases. Downstream thereof, separation equipment 104 is inline with the flowline 101. The separation equipment 104 may include a low pressure and a high pressure knockout drum assembly designed to further separate oil, water, and gases. The flowline 101 thereafter receives HC drainage composition from various gas processing equipment 106, including one or more gas processing units designed to meet gas dehydration, dew-point control, and sales-gas compression specifications. Further inline with flowline 101 is stabilizing equipment 108 comprising one or more stabilizer units and one or more sour water stripper ("SWS") units. The stabilizing equipment 108 is designed to stabilize crude oil to meet hydrogen sulfide and Reid Vapor Pressure specifications and desalt the crude oil to meet salt concentration specifications of not more than 10 pounds per thousand barrels ("PTB").

Next, acid gas handling equipment (AGH) 110 is inline with the flowline 101. The AGH equipment may comprise one or more gas-sweetening units and one or more sulfur-recovery trains for processing sweet or slightly sour crude oil integrated with gas compression. HC drainage composition from liquid surge sphere and propane storage tank equipment 112 is additionally inline with the flowline 101. Finally, HC recovery unit system 114 is inline with flowline 101 and designed to maximize HC separation; the HC recovery unit is described in greater detail in FIG. 2 below.

HC drainage composition flowed into flowline 101 from equipment components 102, 104, 106, 108, 110, 112, and 114 is eventually received by burn pit 120 for burning of the received waste liquid and liquid-gas vapor from the flowline 101. The waste liquid may be referred to herein as a "waste portion of a hydrocarbon drainage composition" or "waste portion of an HC drainage composition," and grammatical variants thereof, and refers to a non-HC or substantially non-HC (e.g., range between 5% and 70% by volume) liquid (mostly water), with a small amount of gas, or solid from a hydrocarbon drainage composition, as defined below.

Figure 2:
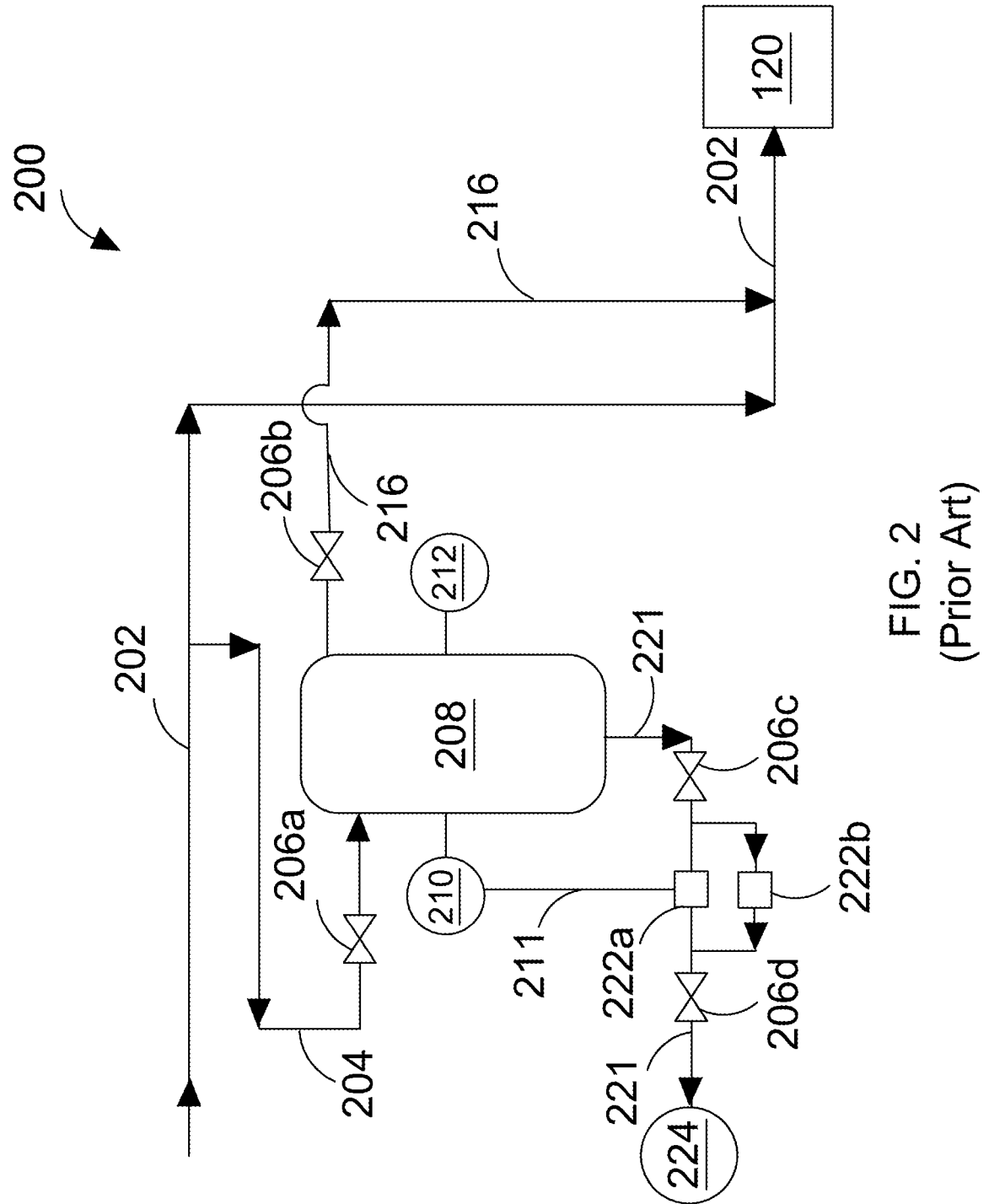
FIG. 2 is a schematic illustration of a prior art hydrocarbon recovery system.

Referring now to FIG. 2, and with continued reference to FIG. 1, provided is a schematic illustration of a prior art HC recovery unit system 200 (e.g., the HC recovery unit system 114 of FIG. 1). As shown, system 200 comprises a wet blowdown header flowline 202 (i.e. the flowline 101 of FIG. 1). In one or more embodiments, flowline 202 may have an inner diameter ("ID") of about 30 inches. Flowline 202 receives HC composition, including oil, water, and gases, from various plant instrumentation, units, and other equipment, and is in fluid communication with HC recovery vessel 208 for collection thereof, as further described herein. In various aspects, the HC recovery vessel 208 may have a vertical orientation with an ID of about 6 feet, a vertical height of about 18 feet, and a liquid holding capacity ranges between 230 to 3,000 gallons. As shown, HC recovery vessel 208 may further comprise a first level transmitter ("LT") 210 and a second LT 212 on two sides of the vessel 208 (e.g., opposing sides, as shown). In various instances, one of LT 210 or LT 212 may be an emergency shutdown ("ESD") LT and the other may be a data communication system ("DCS") LT. For example, LT 210 may be a DCS LT and LT 212 may be an ESD LT.

In operation, system 200 receives HC drainage composition from flowline 202. A first portion of the HC drainage composition in flowline 202 is directly diverted to and in fluid communication with the burn pit 120. A second portion of the drainage in flowline 202 is diverted to and in fluid communication with flowline 204, which is in fluid communication with the HC recovery vessel 208 for receipt of the second drainage portion. Flowline 204 may have an ID of about 10 inches and inline valve 206a may be arranged within the flow line 204 for flow control. In one or more embodiments, the inline valve 206a may be a zone valve. During normal operations, flow within flowline 204 may be about 100 gallons per min ("gpm").

HC recovery vessel 208 operates to separate the remaining HC in flowline 204 from water and gas. The HC recovered by vessel 208 is in fluid communication with surge sphere 224 via flowline 221 for HC collection and further processing through flowline 221. Surge sphere 224 serves as a repository for receiving HC liquid and liquid-vapor to separate HC liquid from water and other negligible solid contaminants and stabilized the condensate at 50 psig during operation of system 200. Surge sphere 224 may have an ID of about 65 feet and a volumetric capacity of about 15,500 bbl. The surge sphere 224 may operate as a three-phase separator with an operational pressure in the range of about 50-55 pounds per square inch gauge (psig), encompassing any value and subset therebetween, such as 50 psig, and an operational temperature in the range of about 90° F. to about 150° F., encompassing any value and subset therebetween.

Flowline 221 is in fluid communication with HC recovery vessel 208 through a bottom outlet thereof. Flowline 221 may have an ID of about 3 inches to about 4 inches, encompassing any value and subset therebetween, such as 4 inches. As shown, a first inline valve 206c and a second inline valve 206d may be arranged within the flowline 221, and a first pump 222a and a second pump 222b may also be arranged to convey fluids through the flowline 221. Each pump 222a,b may operate at about 100 gpm. The two pumps 222a,b may form a redundant feature, where one pump 222a runs (operates) while the other pump 222b is kept on standby mode and put into service (activated) as needed. In some instances, the ID of the flowline 221 may be smaller (e.g., 3 inches) after exiting the second inline valve 206d. The surge sphere 224 may receive the contents of flowline 221 at a pressure of about 80 psig. As shown, when LT 210 is a DSC LT, it may be in data communication with pump 222a via data line 211 to monitor data communication related to flow within flowline 221, pump 222a, and the like. The data line 211 between DSC LT 210 and pump 222a may be controllable to be manually or electronically (including automatically) turned on or off.

With continued reference to FIG. 2, a header outlet of the HC recovery vessel 208 is further in communication with flowline 202 via a return line 216 for overflow of recovery drum, which combines with the flowline 202 to be conveyed to the burn pit 120. As shown, an inline valve 206b is arranged within the return line 216 may have an ID of about 6 inches and the inline valve 206b may be a car seal open valve.

It is to be understood that the pipeline ID sizes may vary depending on various volumetric needs and the valves may be of various types including, but not limited to, zone valves, car seal open valves, pressure butterfly valves, ball valves, tilting valves, gate valves, globe valves, pinch valves, check valves, and the like, and in any combination. It is further to be understood that one or more flowlines may be interposed between two or more components and the flow rate within each flowline of system 200 may vary depending on the needs of a specific implementation of system 200.

As mitigated by the present disclosure, the prior art system 200 can suffer from a number of drawbacks. For example, the capacity of 3,800 gallons of the HC recovery vessel 208 is generally limited for a typical gas plant's ability to recover valuable, available HC during processing. Moreover, system 200 fails to consider significant recovery of HC liquid from the largest equipment in a gas plant, such as the surge sphere 112 (FIG. 1), the inlet slug catcher units 102 (FIG. 1), the propane storage tank 112 (FIG. 1), and other large vessels. Indeed, the limited capacity of the HC recovery vessel 208 hinders such consideration. The system 200 is also not equipped to accommodate high volumes of liquid drained due to slugging, Turnaround and Inspection activities, emergency scenarios, or unexpected abnormal situations.

The present disclosure provides a system and method to maximize recovery of HC, rather than burning otherwise recoverable excess HC in a burn pit. In particular, the present disclosure provides a system and method designed to collect all or substantially all HC drainage composition from a wet HC blowdown header flowline using a large, horizontally configured atmospheric three-phase gravity separator. As described below, the drainage is collected through a three-way control valve connecting an extant HC recovery vessel (e.g., 208 of FIG. 2) and the three-phase gravity separator. The three-way control valve may be associated with control logic operable to efficiently control and maximize blowdown of HC composition liquid within the three-phase gravity separator to achieve zero or near-zero $CO_2$ emissions, increase HC productivity, and reduce asset integrity damage.

Figure 3:
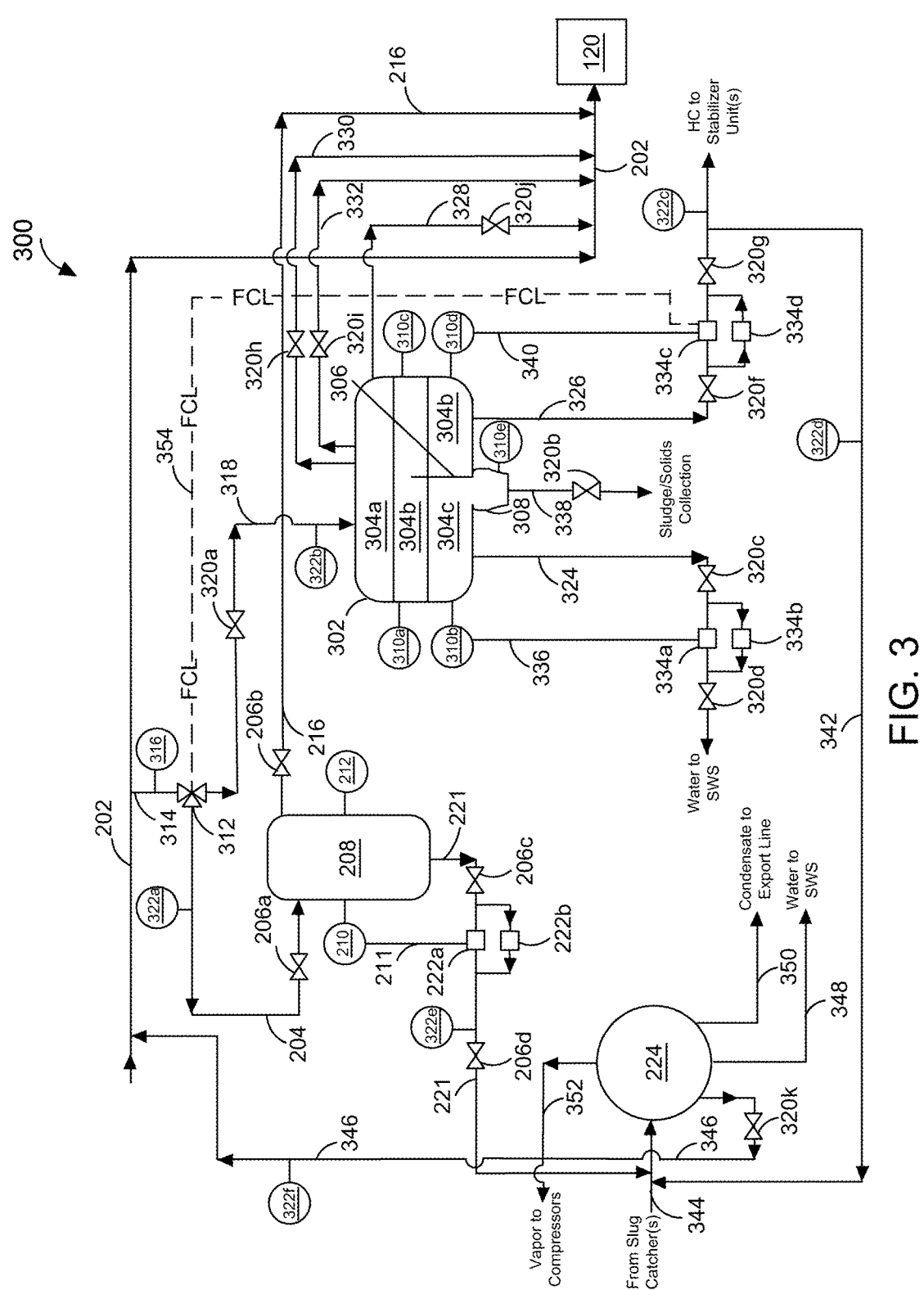
FIG. 3 is a schematic illustration of a hydrocarbon recovery system in accordance with the embodiments of the present disclosure.

Referring now to FIG. 3, with continued reference to FIG. 2, provided is a schematic illustration of an example HC recovery unit system 300 in accordance with the embodiments of the present disclosure. The HC recovery unit system 300 (hereafter "the system 300") may be incorporated into the extant HC recovery system 200 of FIG. 2, accordingly, like references numerals from FIG. 2 are incorporated in FIG. 3 and the details described above with reference to FIG. 2 will not be repeated.

As shown in FIG. 3, the system 300 includes a three-phase gravity separator 302. In one or more embodiments, the separator 302 may have a horizontal orientation with an ID of about 20 feet to about 21 feet, encompassing any value and subset therebetween, such as 20.5 feet; a horizontal length of about 80 feet to about 85 feet, encompassing any value and subset therebetween, such as 82 feet; and a volumetric capacity of about 200,000 gallons to about 230,000 gallons, encompassing any value and subset therebetween, such as 215,000 gallons. The three-phase gravity separator 302 (hereafter "the separator 302") may have a minimum residence time in the range of about 35 minutes to about 40 minutes, which is sufficient to separate gas, HC (i.e., oil), water, as well as solids.

The separator 302 includes a gas layer 304a, an oil layer 304b, a water layer 304c, and a weir 306. The oil layer 304b may comprise an emulsion layer (not shown). The weir 306 is used to separate the oil layer 304b from the gas layer 304a and the water layer 304b, as well as any emulsion layer within the oil layer 304b, the water of which in any emulsion layer is separated into the water layer 304c. The separator 302 further includes a first bottom outlet for expelling (discharging) water from the water layer 304c into flowline 324 in fluid communication therewith. The separator 302 may also include a second bottom outlet for expelling (discharging) HC from the oil layer 304b into flowline 326 in fluid communication therewith. Moreover, the separator 302 may also include a first header outlet for expelling (discharging) gas from the gas layer 304a into flowline 328 in fluid communication therewith. Each of the flowlines 324, 326, 328 will be described in further detail below. The separator 302 further includes at least two header outlets in fluid communication with a first relief flowline 330 and a second relief flowline 332, respectively. The relief flow lines 330, 332 are provided to protect the vessel from any possibility of over pressure build-up due to, for example, a fire case scenario in which the vessel may contain high HC liquid despite the vessel operating at atmospheric pressure. The flowline 328 may comprise a 20 inch line that also helps in overflow conditions to flow fluids to the blowdown return header line 202.

As shown, the separator 308 may include a first LT 310a, a second LT 310b, a third LT 310c, and a fourth LT 310d. Although four LTs 310a-d are shown in FIG. 3, it is to be appreciated that less than or greater than four LTs 310a-d may be associated with the separator 302, without departing from the scope herein. Each of LTs 310a-d may be either an ESD LT or DCS LT. In one embodiment, LT 310a is an ESD LT, LT 310b is a DCS LT, LT 310c is a DCS LT, and LT 310d is an ESD LT.

In one or more embodiments, the system 300 may further include a sludge spool 308 in fluid communication with a bottom portion of the separator 302 and open to the water layer 304c (e.g., as shown in FIG. 3, to the left of the weir 306). The sludge spool 308 serves to remove (receive) sludge or other solids contaminants from the water layer 304c by gravity separation, without any impact on operations (i.e., without the need to shut down operations or the separator 302).

The system 300 may further include a three-way control valve 312, which is provided to control flow between the HC recovery vessel 208 and the separator 302, as described below. The three-way control valve 312 may be equipped with control logic connecting the HC recovery vessel 208 and the separator 302 to ensure receipt of all HC drainage composition between the vessel 208 and separator 302 received from the wet blowdown header flowline 202.

In example operation, the system 300 receives HC drainage composition from the wet blowdown header flowline 202. A first portion of the HC drainage composition in the flowline 202 is directly diverted to and in fluid communication with the burn pit 120. The flowline 202 is in further fluid communication with a recovery flowline 314 to receive a second portion of HC drainage composition from the flowline 202. In some embodiments, the recovery flowline 314 has an ID of 24 inches and inline flow controller 316 communicates with the recovery flowline 314 to monitor the flow within the recovery flowline 314. As illustrated, an inline three-way control valve 312 is arranged within the recovery flowline 314 and in fluid communication with the flowline 204, thereby being able to direct the second portion of HC drainage composition to the HC recovery vessel 208. As shown, an inline flow transmitter ("FT") 322a is in communication with the flowline 204 to monitor the flow within the flowline 204.

The three-way control valve 312 is further in fluid communication with flowline 318, which extends between the three-way control valve 312 and the separator 302. The flowline 318 may have an ID of about 15 inches to about 25 inches, encompassing any value and subset therebetween, such as 20 inches. As shown, an inline valve 320a may be arranged within the flowline 318 and an inline FT 322b may communicate with the flowline 318 to monitor the flow within the flowline 318. In some instances, flow within flowline 318 may be in the range of about 4,500 gpm to about 5,200 gpm, encompassing any value and subset therebetween, such as 4,900 gpm or 5,000 gpm.

Based on control logic fed with real-time data obtained by one or both of the inline flow controller 316 and the inline FT 322b, the three-way valve 312 may be actuatable and otherwise transitionable between a first operational position or "state" and a second operational position or "state". In the first operational state, the three-way valve 312 may be configured to divert all of the HC drainage composition received from the wet blowdown header flowline 202 via the recovery flowline 314 through the larger flowline 318 (e.g., with an ID of 20 inches) and to the three-phase gravity separator 302 (rather than a conventional HC recovery vessel). In the first operational state, the valve towards the smaller flowline 204 feeding the HC recover vessel 208 will remain closed.

The HC drainage composition is received from the larger flowline 318 into the separator 302 and separated into gas layer 304a, oil layer 304b, and water layer 304c. Flow rates through the larger flowline 318 in the first operational state may be up to a predetermined maximum flow rate, as monitored by the inline FT 322b. The predetermined flow rate may be in the range of about 4,500 gpm to about 5,200 gpm, encompassing any value and subset therebetween, such as 4,900 gpm or 5,000 gpm.

When the flow rate through the larger flowline 318 reaches or exceeds the predetermined maximum flow rate (e.g., 4,900 gpm), however, the control logic may be programmed to transition the three-way control valve 312 to the second operational state, where a portion of the HC drainage composition flowing through the recovery flowline 314 is diverted also to the smaller flowline 204 (e.g., with an ID of 10 inches) to be conveyed to the HC recovery vessel 208. Transitioning the three-way control valve 312 to the second operational state may be necessary during an emergency scenario, such as sudden bulk amount of HC liquid drain from any major equipment due to any abnormal situation, such as major leaks, fire or other abnormal situations.

Accordingly, the three-way control valve 312 may be configured to work based on the control logic configuration in such a way that the valve towards the larger flowline 318 will be kept open to divert the HC drainage composition to the separator 302 up to 4,900 gpm, while the valve towards the smaller flowline 204 feeding the HC recover vessel 208 will remain closed. The valve towards the smaller flowline 204 will open when the flow from the wet blowdown header flowline 202 exceeds 4,900 gpm. In some embodiments, the control logic may be programmed to transition the three-way control valve 312 back to the first operational state when flow through the larger flowline 318 can be sustained lower than the predetermined maximum flow rate without diverting flow through the second flowline.

The flowline 324 extends from the separator 302 and receives water from the water layer 304c. The flowline 324 may have an ID of about 5 inches to about 10 inches, encompassing any value and subset therebetween, such as 8 inches. As shown, a first inline valve 320c and a second inline valve 320d may be arranged within the flowline 324, and first and second pumps 334a and 334b may convey water through the flowline 324 at a flow rate of about 150 gpm to about 300 gpm, encompassing any value and subset therebetween, such as 150 gpm. In some instances, the ID of the flowline 324 may be smaller (e.g., 6 inches) after exiting the inline valve 320d. The flowline 324 may be in fluid communication with one or more sour water stripper (SWS) units (see, 108 of FIG. 1) to receive the water from water layer 304c. The SWS unit(s) may receive the water from flowline 324 at a flow rate of about 150 gpm to 300 gpm, encompassing any value and subset therebetween; and at a pressure in the range of about 75 psig to about 85 psig, encompassing any value and subset therebetween, such as 80 psig.

When LT 310*b* is a DSC LT, it may be in data communication with pump 334*a* via data line 336 to monitor data communication related to flow within the flowline 324 and the pump 334*a*. The data line 336 between DSC LT 310*b* and pump 334*a* may be controllable to be manually or electronically (including automatically) turned to an open position (i.e., on) or a closed position (e.g., off). In some embodiments, the first pump 334*a* may be turned on when about 60% by volume water capacity has been reached and the second pump 334*b* may be turned on when about 75% by volume water capacity has been reached. Both pumps 334*a,b* may be turned off when the water capacity is about 10% by volume.

In embodiments that include the sludge spool 308, a flowline 338 may extend from the sludge spool 308 and receive sludge and/or solids from water layer 304*c* through a bottom outlet thereof. The flowline 338 may have an ID of about 10 inches to about 15 inches, encompassing any value and subset therebetween, such as 12 inches. An inline valve 320*b* may be arranged within the flowline 338 and may be normally in a closed position until the sludge spool 308 reaches a predetermined capacity. Once reached, the received sludge and/or solids may be collected within a tank or other vessel for appropriate disposal from flowline 338 by opening the inline valve 320*b*. The predetermined capacity may be in the range of about 70% to about 80% by volume, encompassing any value and subset therebetween. The sludge spool 308 may be equipped with a DSC LT 310*e* capable of monitoring the level of sludge and/or solids within the sludge spool to control the opening of the inline valve 320*b* when the predetermined capacity is reached.

Flowline 326 extends from the separator 302 and receives HC (i.e., HC liquid) from the oil layer 304*b* through a bottom outlet thereof. The flowline 326 may have an ID of about 15 inches to about 25 inches, encompassing any value and subset therebetween, such as 20 inches. As shown, first and second inline valves 320*f* and 320*g* may be arranged within the flowline 326, and first and second pumps 334*c* and 334*d* may be included to help pump fluids through the flowline 326. In some applications, each pump 334*c,d* may operate at about 2,000 gpm to about 4,000 gpm, encompassing any value and subset therebetween, such as 2,000 gpm. In some instances, the ID of the flowline 326 may be smaller (e.g., 16 inches) after exiting the inline valve 320*g*.

As shown, when LT 310*d* is a DSC LT, it may be in data communication with pump 334*c* via data line 340 to monitor data communication related to flow within the flowline 326 and the pump 334*c*. The data line 340 between the DSC LT 310*d* and the pump 334*c* may allow the pump 334*c* to be controlled manually or electronically (including automatically) to turn the pump 334*c* on or off. In some embodiments, the pump 334*c* may be turned on when about 70% by volume HC capacity has been reached, and the pump 334*d* may be turned on when about 85% by volume HC capacity has been reached. Both pumps 334*c,d* may be turned off when the HC capacity is about 10% by volume. Additionally, the pumps 334*c,d* may be controlled using data line 340 and the DSC LT 310*d* such that both pumps 334*c* and 334*d* are turned on simultaneously when the inlet flow from flowline 318 to the separator 302 exceeds about 3,500 gpm.

Upon exiting inline valve 320*g*, a first portion of the HC contents within flowline 326 is directly diverted to one or more stabilizer units (see, 108 of FIG. 1) in fluid communication therewith for expelling the first portion of the HC from oil layer 304*b*. In some embodiments, FT 322*c* may communicate with the flowline 326 and interpose the inline valve 320*g* and the stabilizing units. The FT 322*c* may be configured to monitor and control the flow within a portion of the flowline 326 that is in fluid communication with the one or more stabilizing units. The stabilizer unit(s) may receive the first portion of HC from flowline 326 at a flow rate of about 2,000 gpm to 4,000 gpm, encompassing any value and subset therebetween, and at a pressure in the range of about 450 psig to about 550 psig, encompassing any value and subset therebetween, such as 500 psig.

A second portion of the HC contents within flowline 326 may be diverted to and in fluid communication with flowline 342, which is in fluid communication with flowline 344. Flowline 344 may be configured to convey contents from one or more slug catchers (see, 102 of FIG. 1) and is in fluid communication with the surge sphere 224. Flowline 344 may have an ID in the range of about 20 inches to about 25 inches, encompassing any value and subset therebetween, such as 24 inches. Alternatively, flow line 344 may be in direct fluid communication with an inlet of the surge sphere 224, without departing from the scope described herein. In some embodiments, FT 322*d* may be in communication with the flowline 344 downstream from valve 320*g*.

The flowline 221 extending from the HC recovery vessel 208 may further be in fluid communication with flowline 344, or directly in fluid communication with the surge sphere 224, without departing from the scope of the present disclosure. Moreover, in some embodiments, FT 322*e* may be in communication with flowline 221 upstream of inline valve 206*d* to monitor and control the flow within flowline 221.

In some embodiments, the surge sphere 224 may be in fluid communication with flowline 202 via flowline 346 via a first bottom outlet provided on the surge sphere 224. An inline valve 320*k* may be arranged in the flowline 346 and a FT 322*f* may communicate with the flowline 346 downstream from the inline valve 320*k* to monitor and control the flow within the flowline 346. Flowline 346 may comprise a 20 inch line and may be configured to flow HC liquid and liquid-vapors from the surge sphere 224 and through the inline valve 320*k*, which may normally be in a closed position. The inline valve 320*k* may be opened for emergency situations, such as significant leaks, fire or any other abnormal situations. In such emergency situations, the liquid may be diverted to the HC recovery drum 302 rather than being conveyed to the burn pit 120.

The surge sphere 224 may be further in fluid communication with flowline 348 to convey water from the surge sphere 224 to one or more SWS units (see, 108 of FIG. 1) and may one or more inline valves (not shown) arranged therein. The surge sphere 224 may additionally be in fluid communication with flowline 350 to send stabilized condensate at 50 psig to downstream facilities for further processing through export line. Lastly, gaseous vapor may be expelled from the surge sphere 224 via flowline 352, which is in fluid communication with a 24 inch header outlet line. The gases in the flowline 352 may be conveyed to one or more compressors for further processing.

It is to be appreciated that the flowline 326 may be direct to both the one or more stabilizer units (see, 108 of FIG. 2) and the surge sphere 224 as described herein above or, alternatively, to either singly to the one or more stabilizer units or singly to the surge sphere 224, without departing from the scope of the present disclosure.

Each FT is used in conjunction with the control logic associated with the three-way control valve 312 and a flow control line ("FCL") 354, operable to efficiently control gravity blowdown of HC liquid within the HC recovery vessel 208 and the separator 302. As shown, the FCL line 354 extends between the three-way control valve 312 and the pump 334*c*.

As described with reference to FIG. 2, it is to be understood that the pipeline ID sizes of the system 300 may vary depending on various volumetric needs, and the valves of system 300 may be of various types including, but not limited to, zone valves, car seal open valves, pressure butterfly valves, ball valves, tilting valves, gate valves, globe valves, pinch valves, check valves, solenoid valves, and the like, and in any combination. It is further to be understood that one or more flowlines may be interposed between two or more components and the flow rate within each flowline of system 300 may vary depending on the needs of a specific implementation of system 300. Similarly, the number of FTs distributed throughout the system 300 is nonlimiting and each flowline may comprise no FTs, one FT, or greater than one FT.

Accordingly, the whole of system 300 may be generally described as incorporating a three-phase gravity separator, including inlet and outlet flowlines designed to accommodate all or substantially all HC drainage composition from a wet HC blowdown recovery header arising from drain lines associated with large equipment within a wet HC blowdown recovery system. Such drain lines may have IDs, for example, of 20 inches, and may include surge sphere equipment from inlet slug catchers, propane storage tanks, and other large equipment during regular operations, scheduled maintenance scenarios, or emergency scenarios to ensure that excess HC is eliminated or substantially eliminated from reaching the burn pit. Indeed, the three-phase gravity separator described herein has a substantially larger volumetric capacity (e.g., up to about 230,000 gallons) compared to conventional HC recovery vessels (e.g., 3,800 gallons).

The present disclosure further provides a method of receiving an HC drainage composition into an HC blowdown header flowline, as described above. The three-way control valve receives the HC drainage composition and is either diverted to the HC recovery vessel or the three-phase gravity separator, depending on whether the three-way control valve is in the open or closed position to be received by one or both of the vessel and/or separator. The open or closed position of the three-way control valve may be controlled by the control logic, as described herein. Further, a waste portion of the HC drainage composition may be flowed to the burn pit from one or both of the vessel and/or separator. Non-waste portions of the HC drainage composition (e.g., portions comprising HC) to various other equipment in fluid communication with the header flowline (see, FIG. 1 and FIG. 3).

It is estimated that the methods and systems of the present disclosure may translate into gas plant savings of about 1 million (USD)/year, and further increase burn bit lifetime and associated maintenance costs while achieving zero or near-zero $CO_2$ emissions for significant environmental impact improvement.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A gas plant hydrocarbon recovery management system, comprising:
  a hydrocarbon blowdown header flowline for receiving a hydrocarbon drainage composition;
  a recovery flowline extending from the hydrocarbon blowdown header flowline to receive a portion of the hydrocarbon drainage composition;
  a three-phase gravity separator in fluid communication with the recovery flowline via a first flowline;
  a hydrocarbon recovery vessel in fluid communication via a second flowline; and
  a three-way control valve arranged in the recovery flowline and actuatable between a first operational state, where the portion of the hydrocarbon drainage composition is entirely diverted through the first flowline and to the three-phase gravity separator, and a second operational state, where some of the portion of the hydrocarbon drainage composition is diverted also to the second flowline and to the hydrocarbon recovery vessel,
  wherein the three-way control valve is actuated from the first operational state to the second operational state when a flow rate through the first flowline reaches a predetermined maximum flow rate.

2. The system of claim 1, wherein flow through the second flowline is prevented when the three-way valve is in the first operational state.

3. The system of claim 1, further comprising:

an inline flow transmitter in communication with the first flowline to monitor flow within the first flowline and report when the flow rate through the first flowline reaches the predetermined maximum flow rate; and control logic associated with the three-way valve and programmed to transition the three-way valve between the first and second operational states when the flow rate through the first flowline reaches the predetermined maximum flow rate.

4. The system of claim 3, wherein the predetermined flow rate is in the range of about 4,500 gallons per minute to about 5,000 gallons per minute.

5. The system of claim 1, wherein the first flowline exhibits a diameter larger than a diameter of the second flowline.

6. The system of claim 1, wherein the three-phase gravity separator is operable to separate the portion of the hydrocarbon drainage composition into a gas layer, an oil layer, and a water layer, the system further comprising a sludge spool in fluid communication with the water layer and operable to remove solids contaminants from a bottom of the water layer.

7. The system of claim 6, wherein the oil layer is in fluid communication with a stabilizer unit.

8. The system of claim 7, wherein the oil layer is further in fluid communication with a surge sphere.

9. The system of claim 6, wherein the gas layer is in fluid communication with a burn pit.

10. A method, comprising:

receiving a hydrocarbon drainage composition in a hydrocarbon blowdown header flowline;

diverting a portion of the hydrocarbon drainage composition into a recovery flowline that fluidly communicates with a three-phase gravity separator via a first flowline and fluidly communicates with a hydrocarbon recovery vessel via a second flowline, wherein a three-way control valve is arranged in the recovery flowline;

placing the three-way control valve in a first operational state, where the portion of the HC drainage composition is entirely diverted through the first flowline and to the three-phase gravity separator;

monitoring a flow rate through the first flowline;

determining that the flow rate through the first flowline has reached a predetermined maximum flow rate; and transitioning the three-way control valve to a second operational state, where some of the portion of the HC drainage composition is diverted to the second flowline and to the hydrocarbon recovery vessel.

11. The method of claim 10, further comprising preventing flow through the second flowline when the three-way valve is in the first operational state.

12. The method of claim 10, further comprising:

monitoring the flow within the first flowline with an inline flow transmitter in communication with the first flowline;

reporting with the inline flow transmitter when the flow rate through the first flowline reaches the predetermined maximum flow rate; and causing the three-way valve to transition from the first operational state to the second operational state using control logic associated with the three-way valve and programmed to actuate the three-way valve to the second operational state when the flow rate through the first flowline reaches the predetermined maximum flow rate.

13. The method of claim 10, further comprising:

separating the portion of the hydrocarbon drainage composition into a gas layer, an oil layer, and a water layer with the three-phase gravity separator; and conveying solids contaminants from the water layer into a sludge spool in fluid communication with the water layer.

14. The method of claim 13, further comprising conveying hydrocarbons from the oil layer to at least one of a stabilizer unit and a surge sphere.

15. The method of claim 13, further comprising conveying a gas from the gas layer to a burn pit.

\* \* \* \* \*